(12) United States Patent
Haag et al.

(10) Patent No.: US 11,121,774 B2
(45) Date of Patent: Sep. 14, 2021

(54) ASSIGNMENT AND/OR INSTALLATION OF CABLE MODEM DEVICES TO BE USED WITH A HYBRID FIBER COAXIAL NETWORK PART OF A BROADBAND ACCESS NETWORK

(71) Applicant: Deutsche Telekom AG, Bonn (DE)

(72) Inventors: Thomas Haag, Rodgau (DE); Hans-Joerg Kolbe, Darmstadt (DE)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 16/951,082

(22) Filed: Nov. 18, 2020

(65) Prior Publication Data
US 2021/0159981 A1 May 27, 2021

(30) Foreign Application Priority Data

Nov. 22, 2019 (EP) .................................. 19210837

(51) Int. Cl.
*H04B 10/25* (2013.01)
*H04B 3/02* (2006.01)
*H04Q 11/00* (2006.01)

(52) U.S. Cl.
CPC .............. *H04B 10/25* (2013.01); *H04B 3/02* (2013.01); *H04Q 11/0062* (2013.01)

(58) Field of Classification Search
CPC ...... H04B 10/25; H04B 3/02; H04Q 11/0062; H04L 12/2801; H04L 12/2861; H04L 12/2869

USPC ........................................................... 398/45
See application file for complete search history.

(56) References Cited

U.S. PATENT DOCUMENTS

| | | | |
|---|---|---|---|
| 10,491,462 B1 * | 11/2019 | Wagner | .................... H04L 67/08 |
| 2012/0294613 A1 | 11/2012 | Hood et al. | |
| 2013/0236178 A1 | 9/2013 | Garavaglia et al. | |
| 2014/0199081 A1 * | 7/2014 | Ling | ........................ H04J 14/02 398/116 |
| 2016/0112242 A1 * | 4/2016 | Chanukaev | .......... H04L 12/2898 709/226 |
| 2018/0131582 A1 * | 5/2018 | Schnitzer | ............. H04L 12/2869 |
| 2020/0007413 A1 * | 1/2020 | Kerpez | ................ H04L 41/5019 |
| 2021/0083967 A1 * | 3/2021 | Joshi | .................... H04L 12/2861 |

FOREIGN PATENT DOCUMENTS

EP 3493470 A1 6/2019

* cited by examiner

*Primary Examiner* — Dalzid E Singh
(74) *Attorney, Agent, or Firm* — Leydig, Voit & Mayer, Ltd.

(57) ABSTRACT

A method includes: providing cable modem identification information of a specific cable modem device and infrastructure identification information of a specific coaxial infrastructure access point is provided to an operations support system of a telecommunications network; transmitting the cable modem identification information, the infrastructure identification information, and line identification information to an access orchestrator entity of the telecommunications network; and performing or triggering attachment to the broadband access network using the specific coaxial infrastructure access point and a specific hybrid fiber coaxial network equipment.

8 Claims, 2 Drawing Sheets

ASSIGNMENT AND/OR INSTALLATION OF CABLE MODEM DEVICES TO BE USED WITH A HYBRID FIBER COAXIAL NETWORK PART OF A BROADBAND ACCESS NETWORK

CROSS-REFERENCE TO PRIOR APPLICATIONS

Priority is claimed to European Patent Application No. EP 19210837.1, filed on Nov. 22, 2019, the entire disclosure of which is hereby incorporated by reference herein.

FIELD

The present invention relates a method for improved and simplified operation of a broadband access network of a telecommunications network and/or for improved and more flexible assignment and/or installation of cable modem devices to be used with a hybrid fiber coaxial network part of the broadband access network, wherein the telecommunications network comprises an operations support system, and an access orchestrator entity.

Furthermore, the present invention relates to a telecommunications network for improved and simplified operation of a broadband access network of the telecommunications network and/or for improved and more flexible assignment and/or installation of cable modem devices to be used with a hybrid fiber coaxial network part of the broadband access network, wherein the telecommunications network comprises an operations support system, and an access orchestrator entity.

Additionally, the present invention relates to a system for improved and simplified operation of a broadband access network of a telecommunications network and/or for improved and more flexible assignment and/or installation of cable modem devices to be used with a hybrid fiber coaxial network part of the broadband access network, wherein the telecommunications network comprises an operations support system, and an access orchestrator entity.

Furthermore, the present invention relates to a program, and a computer program product for improved and simplified operation of a broadband access network of a telecommunications network and/or for improved and more flexible assignment and/or installation of cable modem devices to be used with a hybrid fiber coaxial network part of the broadband access network.

BACKGROUND

The exchange of packetized information in broadband communication systems or telecommunications networks, both in fixed-line as in wireless communication systems (or fixed-line communication networks and mobile communication networks) has already grown dramatically and probably will also grow in the future due to the rapid spread of different data services in such communication networks.

The present application generally relates to the area of aggregation networks linking remote or central access nodes to a backbone network or core network of the telecommunications network, e.g. broadband access network platforms such as 5G or CORD (Central Office Re-architected as a Data Center).

Typically in such architectures, multiple network termination ports are aggregated by an access node (e.g. a CMTS (Cable Modem Termination System), a DSLAM device (Digital Subscriber Line Access Multiplexer) or an OLT (Optical Line Terminal) device).

Hybrid fiber coaxial networks today typically include one or a plurality of CMTS systems, and a provisioning system assigning the cable modem devices or cable modem endpoints statically. This means a hardware address is preconfigured per subscriber endpoint on an existing hybrid fiber coaxial network, and this also means that a customer premises equipment, typically the cable modem, is not free of choice. This provides an inflexible and static provisioning and registration process and a selection function of service edges that is triggered by the cable modem, or the cable modem identity.

SUMMARY

In an exemplary embodiment, the present invention provides a method. The method includes: in a first step, cable modem identification information of a specific cable modem device and infrastructure identification information of a specific coaxial infrastructure access point is provided to an operations support system of a telecommunications network using a communication channel bypassing the specific coaxial infrastructure access point, wherein the specific cable modem device is to be used with a specific hybrid fiber coaxial network equipment and in connection with the specific coaxial infrastructure access point; in a second step, subsequent to the first step, the cable modem identification information, the infrastructure identification information, and line identification information are transmitted to an access orchestrator entity of the telecommunications network, wherein subsequent to the second step, the specific cable modem device is registered with a broadband access network of the telecommunications network; and in a third step, subsequent to the registration of the specific cable modem device with the broadband access network, the specific cable modem device performs or triggers attachment to the broadband access network using the specific coaxial infrastructure access point and the specific hybrid fiber coaxial network equipment.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1:
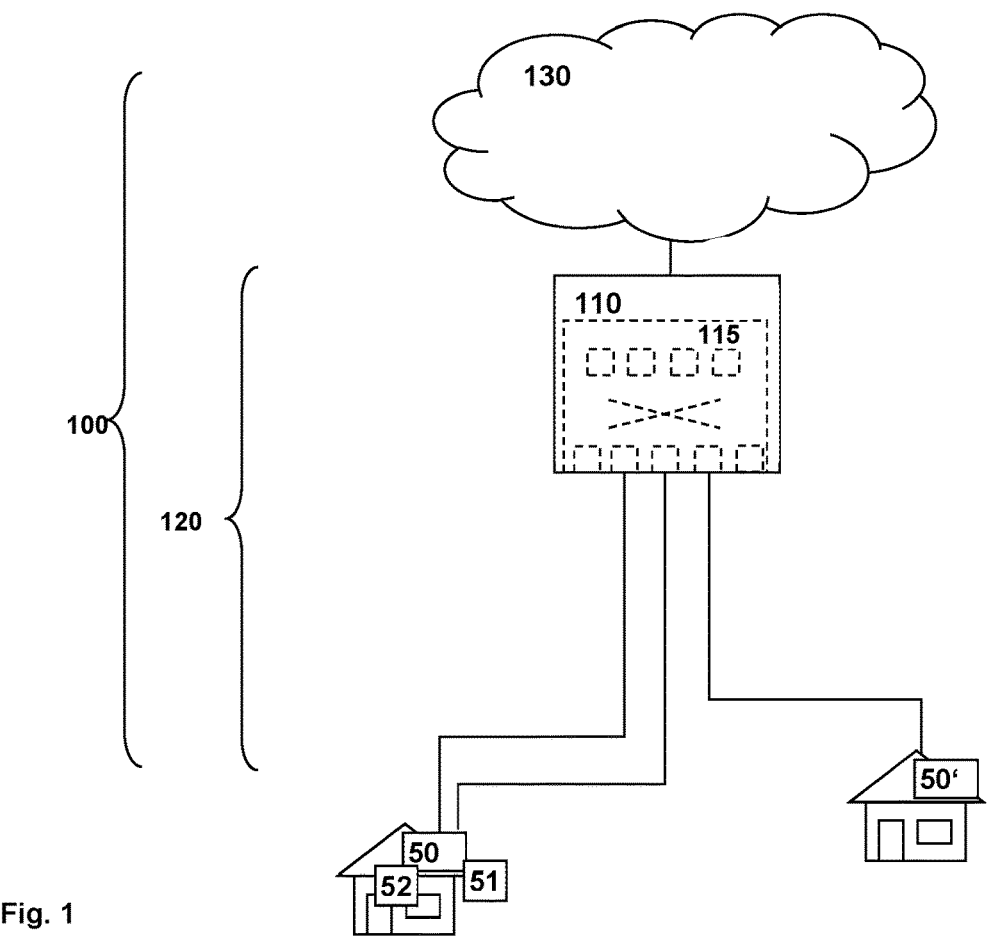
FIG. 1 schematically illustrates a telecommunications network according to the present invention, having a broadband access network with a central office point of delivery.

Exemplary embodiments of the present invention provide a technically simple, effective and cost effective solution for improved and simplified operation of a broadband access network of a telecommunications network and/or for improved and more flexible assignment and/or installation of cable modem devices to be used with a hybrid fiber coaxial network part of the broadband access network, wherein the telecommunications network comprises an operations support system, and an access orchestrator entity, and wherein the federation of the respective cable modem identification information, the infrastructure identification information of the access point, as well as the line identification information is performed only upon actually connecting the respective cable modem. Exemplary embodiments of the present invention further provide a corresponding telecommunications network, a corresponding system, and a corresponding program and computer program product.

Exemplary embodiments of the present invention provide a method for improved and simplified operation of a broadband access network of a telecommunications network and/or for improved and more flexible assignment and/or installation of cable modem devices to be used with a hybrid fiber coaxial network part of the broadband access network, wherein the telecommunications network comprises an operations support system, and an access orchestrator entity, wherein in order to provide for improved and more flexible assignment and/or installation of a specific cable modem device to be used with and/or connected to a specific hybrid fiber coaxial network equipment, and in connection to a specific coaxial infrastructure access point, the method comprises the following steps:

in a first step, cable modem identification information of the specific cable modem device and infrastructure identification information of the specific coaxial infrastructure access point is provided or transmitted to the operations support system using a communication channel bypassing the specific coaxial infrastructure access point, in a second step, subsequent to the first step, the cable modem identification information of the specific cable modem device, the infrastructure identification information of the specific coaxial infrastructure access point, as well as line identification information are transmitted to the access orchestrator entity, wherein subsequent to the second step, the specific cable modem device is registered with the broadband access network, in a third step, subsequent to the registration of the specific cable modem device with the broadband access network, the specific cable modem device performs or triggers an attachment operation and/or is able to attach to the broadband access network, using the specific coaxial infrastructure access point and the specific hybrid fiber coaxial network equipment.

It is thereby advantageously possible according to the present invention to provide a solution such that improved and simplified operation of a broadband access network of a telecommunications network and/or improved and more flexible assignment and/or installation of cable modem devices is possible to be used with a hybrid fiber coaxial network part of the broadband access network. Especially, it is advantageously possible according to the present invention, to provide a mechanism to provision and operate a hybrid fiber coaxial network by using auto installation procedures which especially enables automatic learning and association of the customer end point in a shared hybrid fiber coaxial network and enables a decoupling of the installation of the cable modem termination system installation from the installation of the cable modem, as well as from the service provisioning. Additionally, it is advantageously possible according to the present invention that centralized auto-discovery in hybrid fiber coaxial networks (and coaxial networks) is possible as well as centralized service provisioning. A further advantage according to the present invention is the possibility of semi-nomadic behavior, i.e. it is possible to move from one flat to another flat without a change in the network configuration. Furthermore, it is advantageous to realize a federation of the access port (at the cable modem termination system) and the endpoint (at the cable modem), and it is possible to apply a wholesale approach and a slicing approach on hybrid fiber coaxial networks (or coaxial networks).

In conventionally known hybrid fiber coaxial networks, a cable modem (to be provided to a customer in order to be installed in the customers home as, typically, a customer premises equipment) is typically associated to an access node (or a cable modem termination system) or even to a port of an access node (i.e. a cable modem termination system) prior to being dispatched or provided to the customer, thus leading to the operator (and the customer) being required to maintain the pre-defined relationship or association between the respective (or specific) cable modem and the respective (or specific) (port of the) cable modem termination system. Hence, there is conventionally no possibility of auto-detection and verification of cable modems hardware.

Exemplary embodiments of the present invention address auto-installation procedures. Thereby, it is advantageously possible to realize a centralized and automated solution for the management of customer premises equipment in the form of cable modems in a centralized way as well as, especially, a possibility to provide for a verification by a centralized database (and a possibility to detect any modifications of the used cable modem at a specific location or home.

In an exemplary embodiment of the present invention, the telecommunications network comprises an operations support system, and an access orchestrator entity. The assignment and/or installation of a specific cable modem device to be used with and/or connected to a specific hybrid fiber coaxial network equipment, and in connection to a specific coaxial infrastructure access point, is realized via:

providing and/or transmitting both cable modem identification information of the specific cable modem device and infrastructure identification information of the specific coaxial infrastructure access point to the operations support system; for this transfer or transmission, a communication channel is used that bypasses at least the specific coaxial infrastructure access point, i.e. typically the broadband access network is not used but, e.g., a wireless access network, in order to reach the operations support system or a server site or other entity that in turn transmits the relevant pieces of information to the operations support system;

after the operations support system received the cable modem identification information (of the specific cable modem device) and the infrastructure identification information (of the specific coaxial infrastructure access point), the cable modem identification information, the infrastructure identification information, and line identification information are transmitted to the access orchestrator entity; by executing or achieving the step of transmitting these three pieces of information to the access orchestrator entity, the registration of the specific cable modem device is finished, i.e. the specific cable modem device is registered with the broadband access network, after the specific cable modem has been successfully registered with the broadband access network, the specific cable modem device is able to be attached to the broadband access network, i.e. an attachment operation may be able to be performed to the broadband access network, using the specific coaxial infrastructure access point and the specific hybrid fiber coaxial network equipment.

The telecommunications network according to the present invention may be a fixed-line telecommunications network or a mobile communication network but preferably is a telecommunications network having both aspects (or parts) of a fixed-line telecommunications network (or being a fixed-line telecommunications network in such parts) and aspects (or parts) of a mobile communication network (or being a mobile communication network in such parts); such networks are also known under the term fixed-mobile-convergence networks (FMC networks).

According to the present invention, it is advantageously possible and preferred that the telecommunications network comprises a central office point of delivery, wherein the central office point of delivery and/or the broadband access network comprises a plurality of line termination nodes, wherein at least part of the line termination nodes—and regarding a hybrid fiber coaxial network part of the broadband access network—are realized as hybrid fiber coaxial network equipments.

It is thereby advantageously possible to integrate hybrid fiber coaxial network parts into the broadband access network.

Furthermore, it is advantageously possible and preferred according to the present invention that for the transmission, in the first step, of the cable modem identification information of the specific cable modem device and of the infrastructure identification information of the specific coaxial infrastructure access point, to the operations support system, a separate communication channel, bypassing the specific coaxial infrastructure access point,—especially outside of the broadband access network, or, at least, separate from using the specific coaxial infrastructure access point—is used, especially a communication channel between a client device and the operations support system, wherein especially the client device is able to be connected to the specific cable modem device.

By using a separate communication channel, bypassing the specific coaxial infrastructure access point, an enhanced degree of security is able to be achieved, and also an enhanced level of flexibility in associating a given cable modem device to a specific customer.

Furthermore, and according to an alternative embodiment of the present invention, it is preferred that—during the first step but prior to providing and/or transmitting the cable modem identification information of the specific cable modem device and/or the infrastructure identification information of the specific coaxial infrastructure access point to the operations support system—the cable modem identification information and/or the infrastructure identification information is/are detected by the client device, especially via a scanning operation, or provided to the client device.

By detecting the cable modem identification information and/or the infrastructure identification information, especially by the client device, it is advantageously possible to flexibly associate the specific cable modem device to a specific infrastructure item such as a coaxial access point.

According to a further preferred embodiment of the present invention, the broadband access network comprises a switching fabric within the central office point of delivery, the switching fabric especially comprising a plurality of spine network nodes and a plurality of leaf network nodes.

By using a switching fabric comprising spine network nodes and leaf network nodes, it is efficiently possible to provide the user-related traffic to the appropriate central functional entity of the broadband access network and/or of the telecommunications network.

According to further embodiments of the present invention, it is furthermore preferred that the telecommunications network, especially the broadband access network, comprises at least one service edge node or service edge functionality, wherein a service edge node or service edge functionality is realized in at least one out of the following nodes or entities:

in at least one of the leaf network nodes of the switching fabric, in at least one of the spine network nodes of the switching fabric, in a network entity outside of the switching fabric, especially in a backbone network or in a partner network of a wholesale partner.

Thereby, it is advantageously possible to realize the broadband access network such that an increased level of flexibility can be achieved.

Furthermore, the present invention relates to a telecommunications network for improved and simplified operation of a broadband access network of a telecommunications network and/or for improved and more flexible assignment and/or installation of cable modem devices to be used with a hybrid fiber coaxial network part of the broadband access network, wherein the telecommunications network comprises an operations support system, and an access orchestrator entity, wherein in order to provide for improved and more flexible assignment and/or installation of a specific cable modem device to be used with and/or connected to a specific hybrid fiber coaxial network equipment, and in connection to a specific coaxial infrastructure access point, the telecommunications network is configured such that:

cable modem identification information of the specific cable modem device and infrastructure identification information of the specific coaxial infrastructure access point is provided or transmitted to the operations support system using a communication channel bypassing the specific coaxial infrastructure access point, the cable modem identification information of the specific cable modem device, the infrastructure identification information of the specific coaxial infrastructure access point, as well as line identification information are transmitted to the access orchestrator entity, wherein subsequent to the second step, the specific cable modem device is registered with the broadband access network, subsequent to the registration of the specific cable modem device with the broadband access network, the specific cable modem device performs or triggers an attachment operation and/or is able to attach to the broadband access network, using the specific coaxial infrastructure access point and the specific hybrid fiber coaxial network equipment.

Additionally, the present invention relates to a system for improved and simplified operation of a broadband access network of a telecommunications network and/or for improved and more flexible assignment and/or installation of cable modem devices to be used with a hybrid fiber coaxial network part of the broadband access network, wherein the telecommunications network comprises an operations support system, and an access orchestrator entity, wherein in order to provide for improved and more flexible assignment and/or installation of a specific cable modem device to be used with and/or connected to a specific hybrid fiber coaxial network equipment, and in connection to a specific coaxial infrastructure access point, the system is configured such that:

cable modem identification information of the specific cable modem device and infrastructure identification information of the specific coaxial infrastructure access point is provided or transmitted to the operations support system using a communication channel bypassing the specific coaxial infrastructure access point, the cable modem identification information of the specific cable modem device, the infrastructure identification information of the specific coaxial infrastructure access point, as well as line identification information are transmitted to the access orchestrator entity, wherein subsequent to the second step, the specific cable modem device is registered with the broadband access network, subsequent to the registration of the specific cable modem device with the broadband access network, the specific cable modem device performs or triggers an attachment operation and/or is able to attach to the broadband access network, using the specific coaxial infrastructure access point and the specific hybrid fiber coaxial network equipment.

Still additionally, the present invention relates to a program comprising a computer readable program code which, when executed on a computer and/or on a logical or physical central office point of delivery and/or on an operations support system and/or on an access orchestrator entity, or in part on a logical or physical central office point of delivery and/or in part on an operations support system and/or in part on an access orchestrator entity, causes the computer and/or the logical or physical central office point of delivery and/or the operations support system and/or the access orchestrator entity to perform an exemplary embodiment of the inventive method.

Furthermore, the present invention relates to a computer program product for improved and simplified operation of a broadband access network of a telecommunications network and/or for improved and more flexible assignment and/or installation of cable modem devices to be used with a hybrid fiber coaxial network part of the broadband access network, the computer program product comprising a computer program stored on a storage medium, the computer program comprising program code which, when executed on a computer and/or on a logical or physical central office point of delivery and/or on an operations support system and/or on an access orchestrator entity, or in part on a logical or physical central office point of delivery and/or in part on an operations support system and/or in part on an access orchestrator entity, causes the computer and/or the logical or physical central office point of delivery and/or the operations support system and/or the access orchestrator entity to perform an exemplary embodiment of the inventive method.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

In FIG. 1, a telecommunications network 100 according to the present invention is schematically shown, having—preferably—at least a fixed line part. A mobile (or cellular) part may be present as well, as part of the telecommunications network 100. User equipment or client devices 51, 52 are connected to the telecommunications network 100 via a (broadband) access network 120. The telecommunications network 100 comprises, especially as part of the broadband access network 120, at least one logical or physical central office point of delivery 110 that is preferably realized within a data center and that is especially handling different access requirements, especially different access possibilities, of the client devices 51, 52 to network functionalities provided by the telecommunications network 100 or via the telecommunications network 100. The client devices 51, 52 are typically connected to the logical or physical central office point of delivery 110 via a customer premises equipment device 50, 50' or via a customer premises equipment functionality that may be built in the client devices 51, 52. Preferably but not necessarily, the central office point of delivery 110 comprises a switching fabric 115 comprising a plurality of spine network nodes and typically also a plurality of leaf network nodes.

Figure 2:
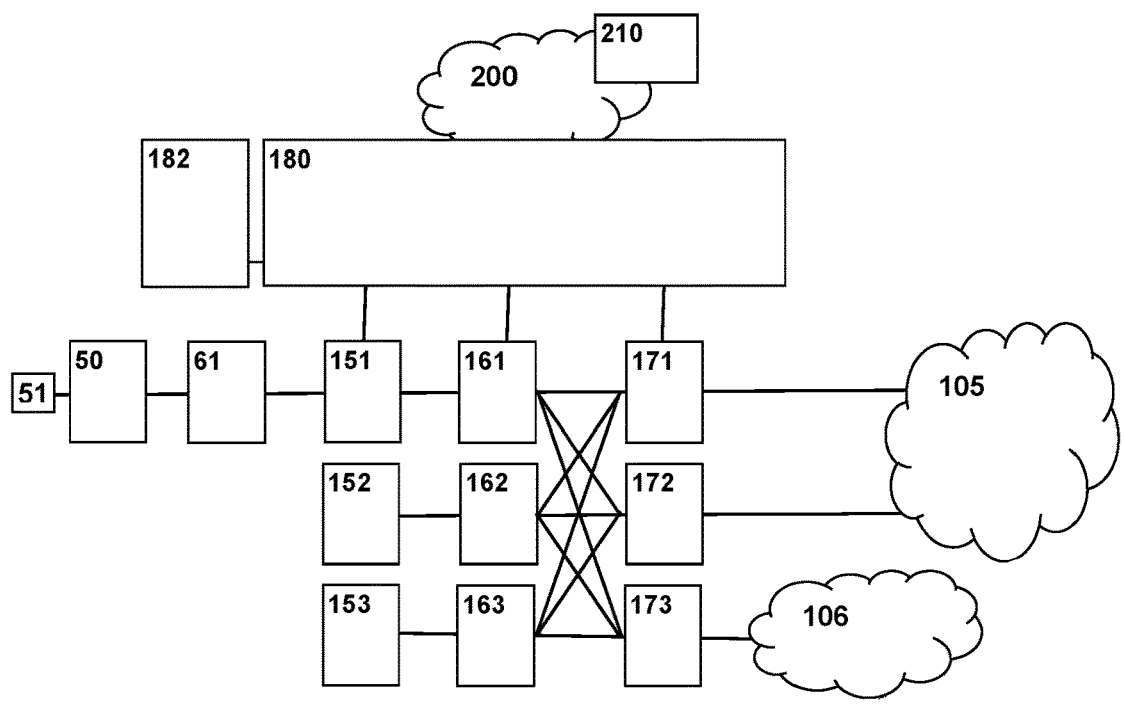
FIG. 2 schematically illustrates a part of a broadband access network of a telecommunications network with a central office point of delivery as well as an operations support system and an access orchestrator entity.

FIG. 2 schematically illustrates a central office point of delivery 110 as part of a broadband access network 120 of a telecommunications network 100, wherein the represented part of the telecommunications network 100 comprises—besides an operations support system 210 and an access orchestrator entity 180—a plurality of line termination nodes 151, 152, 153. In the example represented in FIG. 2, the broadband access network 120 comprises three line termination nodes, a first line termination node 151, a second line termination node 152, and a third line termination node 153. The line termination nodes 151, 152, 153 may be provided to support different access technologies to a home gateway or customer premises equipment or cable modem 50. In the exemplary embodiment shown in FIG. 2, the first line termination node 151 is taken as a line termination node in the form of a hybrid fiber coaxial network equipment, supporting to be connected to a hybrid fiber coaxial network, typically comprising a plurality of (passive) coaxial infrastructure access points. One (specific) coaxial access point 61 of this plurality of coaxial infrastructure access points is schematically shown as being connected to the first (or specific) line termination node 151 (or hybrid fiber coaxial network equipment), which is realized as a cable modem termination system 151 for (or within) the hybrid fiber coaxial network. In such a situation, a client device 51 (or a plurality of client devices which are not specifically represented in FIG. 2) is (or are) connected to the telecommunications network 100 (i.e. to the first (or also called specific) line termination node 151 or hybrid fiber coaxial network equipment) via the cable modem 50 (or customer premises equipment 50 or home gateway device 50) and the (specific) coaxial infrastructure access point 61. The functionality of the client device 51 and the functionality of the customer premises equipment 50 (or home gateway device 50 or cable modem 50) may be integrated in one device or "box". Nevertheless, these functionalities are represented in FIG. 2 as separated functionalities. In FIG. 2, only one cable modem device 50 (or customer premises equipment 50) (i.e. a specific customer premises equipment), and only one client device 51, and only one coaxial infrastructure access point 61 are shown. However, also the second and/or third line termination nodes 152, 153 may be realized as hybrid fiber coaxial network equipment, connected to corresponding coaxial infrastructure access points and cable modem devices (not represented in FIG. 2).

In the context of the present invention, in order to separate the "specific" or considered entities from the other entities of the same kind within the broadband access network 120, the first line termination node 151 (or hybrid fiber coaxial network equipment) is also called the specific line termination node 151 (or specific hybrid fiber coaxial network equipment), the coaxial infrastructure access point 61 connected to the first hybrid fiber coaxial network equipment 151 is also called the specific coaxial infrastructure access point 61, and the customer premises equipment 50 connected to the specific coaxial infrastructure access point 61 is also called the specific customer premises equipment 50 (or specific cable modem device 50).

In case of the line termination nodes 151, 152, 153 having a plurality of access node ports, also a plurality of network termination nodes are able to be connected to one line termination node 151, 152, 153 and/or (in case that a coaxial infrastructure access point has a plurality of ports) also a plurality of customer premises equipments are able to be connected to one coaxial infrastructure access point.

According to the present invention, a method for improved and simplified operation of a broadband access network 120 of a telecommunications network 100 and/or for improved and more flexible assignment and/or installation of cable modem devices to be used with a hybrid fiber coaxial network part of the broadband access network 120 as well as a corresponding architecture of a central office point of delivery 110 is provided. Especially, this serves to flexibly assign and/or install cable modem device to the broadband access network 120.

According to the present invention, the telecommunications network 100 comprises an operations support system 210, and an access orchestrator entity 180.

The assignment and/or the installation of the specific cable modem device 50 to be used with and/or connected to the specific hybrid fiber coaxial network equipment 151 involves the following steps:

in a first step, cable modem identification information of the specific cable modem device 50 and infrastructure identification information of the specific coaxial infrastructure access point 61 is provided or transmitted to the operations support system 210 using a communication channel bypassing the specific coaxial infrastructure access point 61, in a second step, subsequent to the first step, the cable modem identification information of the specific cable modem device 50, the infrastructure identification information of the specific coaxial infrastructure access point 61, as well as line identification information are transmitted to the access orchestrator entity 180, wherein subsequent to the second step, the specific cable modem device 50 is registered with the broadband access network 120, in a third step, subsequent to the registration of the specific cable modem device 50 with the broadband access network 120, the specific cable modem device 50 performs or triggers an attachment operation and/or is able to attach to the broadband access network 120, using the specific coaxial infrastructure access point 61 and the specific hybrid fiber coaxial network equipment 151.

According to the present invention, it is preferred that the broadband access network 120 comprises a switching fabric 115 within the central office point of delivery 110, wherein the switching fabric 115 especially comprising a plurality of spine network nodes 171, 172, 173 and a plurality of leaf network nodes 161, 162, 163. Additionally, a backbone network 105 and/or a further network 106, e.g. a partner network of a wholesale partner, are schematically represented in FIG. 2.

Furthermore according to the present invention, the telecommunications network 100, and especially the broadband access network 120, comprises at least one service edge node or service edge functionality, wherein a service edge node or service edge functionality is realized either in at least one of the leaf network nodes 161, 162, 163 of the switching fabric 115, or in at least one of the spine network nodes 171, 172, 173 of the switching fabric 115, or in a network entity outside of the switching fabric 115, especially in a backbone network 105 or in a partner network 106 of a wholesale partner. Different customers, i.e. different cable modem devices 50 (or customer premises equipments) may use different entities or network nodes as service edge node or service edge functionality; hence a service edge node or a service edge functionality may be realized, e.g., in both one of the leaf network nodes 161, 162, 163 of the switching fabric 115 (or in one of the spine network nodes 171, 172, 173) and in a network entity outside of the switching fabric 115, e.g. in the partner network 106 (which is, typically, a (or another) telecommunications network in its own right).

Figure 3:
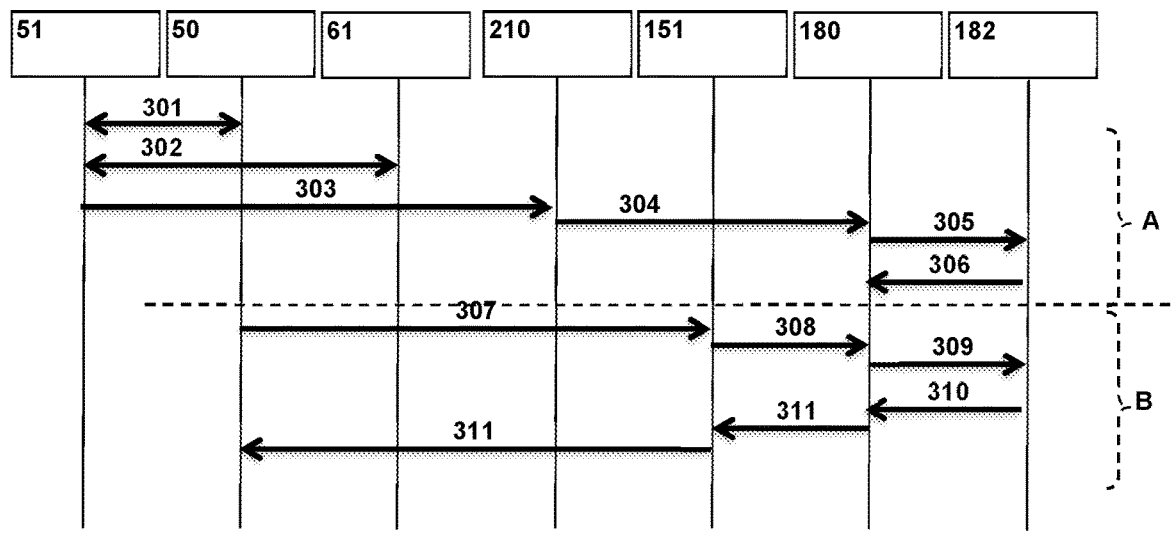
FIG. 3 schematically illustrates an example of a communication diagram relating to assigning and/or installing and/or registering a specific cable modem device to be used with and/or connected to a specific hybrid fiber coaxial network equipment, and in connection to a specific coaxial infrastructure access point.

In FIG. 3, an example of a communication diagram relating to assigning and/or installing and/or registering a specific cable modem device 50 to be used with and/or connected to a specific hybrid fiber coaxial network equipment 151, and in connection to a specific coaxial infrastructure access point 61. Besides these three entities, the communication diagram shows the client device 51, the operations support system 210, the access orchestrator entity 180, and the repository node 182. The client device 51 is typically to be connected to the cable modem device 50 after the cable modem device is registered to the broadband access network 120.

In order to achieve a registration (represented by reference sign A in FIG. 3) of the cable modem or cable modem device 50 to the broadband access network 120, six processing steps, the first to sixth processing step 301, 302, 303, 304, 305, 306 are performed. In the first processing step 301, the cable modem identification information—especially a hardware address—of the specific cable modem device 50 (or home device) is acquired, e.g. via a scanning operation, using the client device 51, of the specific cable modem device 50. In the second processing step 302, the infrastructure identification information—especially a hardware address—of the specific coaxial infrastructure access point 61 is acquired, likewise e.g. via a scanning operation, using the client device 51, of the specific coaxial infrastructure access point 61. In the third processing step 303, both the cable modem identification information of the specific cable modem device 50 and the infrastructure identification information of the specific coaxial infrastructure access point 61 are provided or transmitted to the operations support system 210. This transmission is performed using a communication channel other than the access to the broadband access network 120 to establish, i.e. at least bypassing the specific coaxial infrastructure access point 61.

In the fourth processing step 304, the registration information—comprising the cable modem identification information of the specific cable modem device 50, the infrastructure identification information of the specific coaxial infrastructure access point 61, as well as the line identification information—is provided or transmitted to the access orchestrator entity 180. In the fifth processing step 305, the registration of the specific cable modem device 50 is requested (by the access orchestrator entity 180) at the repository node 182, and, in the sixth processing step 306, the registration of the specific cable modem device 50 is acknowledged by the repository node 182. After the sixth processing step 306, the registration process of the specific cable modem device 50 is terminated, and the cable modem device 50 is able to be attached to the broadband access network 120.

The attachment (represented by reference sign B in FIG. 3) of the cable modem device 50 is briefly also shown in FIG. 3, involving also six processing steps, seventh to twelfth processing step 307, 308, 309, 310, 311, 312 to be performed. In the seventh processing step 307, the cable modem device 50 transmits an attachment request message to the hybrid fiber coaxial network equipment 151. In the eighth processing step 308, the attachment request is transmitted, by the hybrid fiber coaxial network equipment 151 to the access orchestrator entity 180. In the ninth processing step 309, the attachment request is transmitted, by the access orchestrator entity 180 to the repository node 182. In the tenth processing step 310, the attachment of the specific cable modem device 50 is acknowledged by the repository node 182. In the eleventh processing step 311, the communication profile is set by the access orchestrator entity 180, and transmitted to the hybrid fiber coaxial network equipment 151. In the twelfth processing step 311, the hybrid fiber coaxial network equipment 151 transmits an attachment acknowledge message to the cable modem device 50.

Via the process shown, a logical point-to-point connection may be realized according to the present invention, between the interface of the hybrid fiber coaxial network equipment 151 towards the central office point of delivery 115 (this interface is also called logical access termination identification, or LAT-ID), and the external interface of the cable modem device 50, especially where the client device 51 is connected to the cable modem device 50. Both the cable modem identification information and the infrastructure identification information are associated to the line identification information at the access orchestrator entity 180 and/or repository node 182.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method, comprising:
   in a first step, cable modem identification information of a specific cable modem device and infrastructure identification information of a specific coaxial infrastructure access point is provided to an operations support system of a telecommunications network using a communication channel bypassing the specific coaxial infrastructure access point, wherein the specific cable modem device is to be used with a specific hybrid fiber coaxial network equipment and in connection with the specific coaxial infrastructure access point;
   in a second step, subsequent to the first step, the cable modem identification information, the infrastructure identification information, and line identification information are transmitted to an access orchestrator entity of the telecommunications network, wherein subsequent to the second step, the specific cable modem device is registered with a broadband access network of the telecommunications network; and
   in a third step, subsequent to the registration of the specific cable modem device with the broadband access network, the specific cable modem device performs or triggers attachment to the broadband access network using the specific coaxial infrastructure access point and the specific hybrid fiber coaxial network equipment.

2. The method according to claim 1, wherein the telecommunications network comprises a central office point of delivery, wherein the central office point of delivery and/or the broadband access network comprises a plurality of line termination nodes, wherein at least part of the line termination nodes relate to a hybrid fiber coaxial network part of the broadband access network and are realized as hybrid fiber coaxial network equipments.

3. The method according to claim 2, wherein the broadband access network comprises a switching fabric within the central office point of delivery, the switching fabric comprising a plurality of spine network nodes and a plurality of leaf network nodes.

4. The method according to claim 3, wherein the broadband access network comprises at least one service edge node or service edge functionality, wherein the at least one service edge node or service edge functionality is realized:

in at least one of the leaf network nodes of the switching fabric;

in at least one of the spine network nodes of the switching fabric; and/or in a network entity outside of the switching fabric.

5. The method according to claim 1, wherein for the transmission, in the first step, of the cable modem identification information and the infrastructure identification information to the operations support system, a separate communication channel, bypassing the specific coaxial infrastructure access point is used, wherein the separate communication channel is between a client device and the operations support system.

6. The method according to claim 5, wherein—during the first step and prior to providing the cable modem identification information and/or the infrastructure identification information to the operations support system—the cable modem identification information and/or the infrastructure identification information is/are detected by the client device via a scanning operation or provided to the client device.

7. A telecommunications system, comprising:
a specific cable modem device;
an operations support system; and
an access orchestrator entity;
wherein the operations support system is configured to receive cable modem identification information of the specific cable modem device and infrastructure identification information of a specific coaxial infrastructure access point via a communication channel bypassing the specific coaxial infrastructure access point, wherein the specific cable modem device is to be used with a specific hybrid fiber coaxial network equipment and in connection with the specific coaxial infrastructure access point;
wherein the access orchestrator entity is configured to receive the cable modem identification information, the infrastructure identification information, and line identification information to facilitate registration of the specific cable modem device with a broadband access network of telecommunications network; and
wherein the specific cable modem device is configured, after registration of the specific cable modem device with the broadband access network, to perform or trigger attachment to the broadband access network using the specific coaxial infrastructure access point and the specific hybrid fiber coaxial network equipment.

8. One or more non-transitory computer-readable mediums having processor-executable instructions stored thereon, wherein the processor-executable instructions, when executed, facilitate:
in a first step, cable modem identification information of a specific cable modem device and infrastructure identification information of a specific coaxial infrastructure access point is provided to an operations support system of a telecommunications network using a communication channel bypassing the specific coaxial infrastructure access point, wherein the specific cable modem device is to be used with a specific hybrid fiber coaxial network equipment and in connection with the specific coaxial infrastructure access point;
in a second step, subsequent to the first step, the cable modem identification information, the infrastructure identification information, and line identification information are transmitted to an access orchestrator entity of the telecommunications network, wherein subsequent to the second step, the specific cable modem device is registered with a broadband access network of the telecommunications network; and
in a third step, subsequent to the registration of the specific cable modem device with the broadband access network, the specific cable modem device performs or triggers attachment to the broadband access network using the specific coaxial infrastructure access point and the specific hybrid fiber coaxial network equipment.

\* \* \* \* \*